G. A. HUSE.
Car-Starter.
No. 161,042.
Patented March 23, 1875.
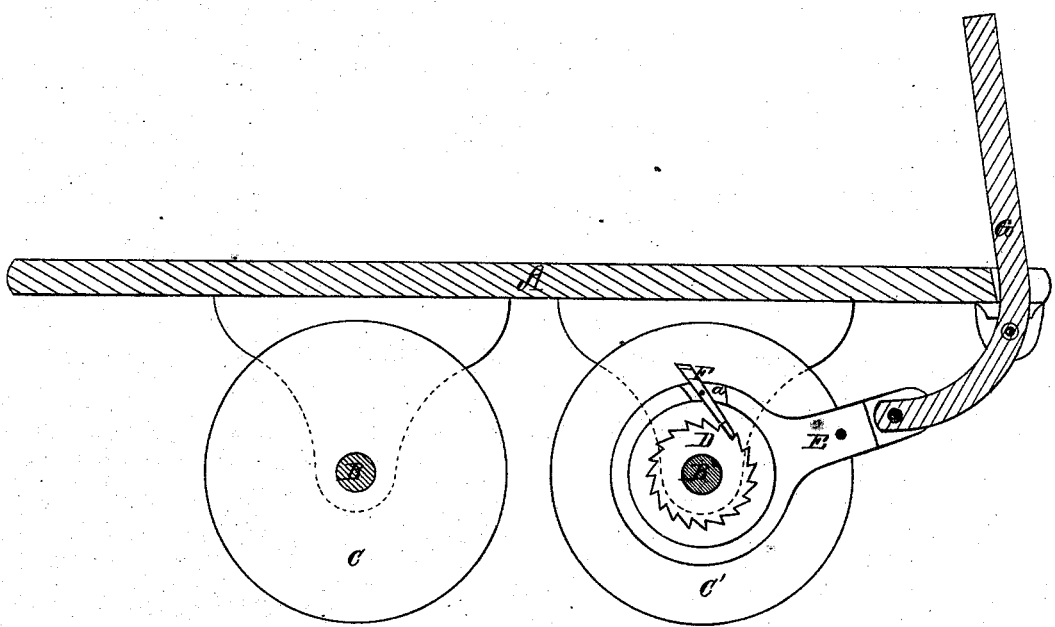
Witnesses.
S. N. Piper
L. N. McColean.
George A. Huse.
by his attorney
R. H. Eddy

UNITED STATES PATENT OFFICE.

GEORGE A. HUSE, OF NEWBURYPORT, MASSACHUSETTS.

IMPROVEMENT IN CAR-STARTERS.

Specification forming part of Letters Patent No. 161,042, dated March 23, 1875; application filed January 20, 1875.

*To all whom it may concern:*

Be it known that I, GEORGE A. HUSE, of Newburyport, of the county of Essex and State of Massachusetts, have invented a new and useful Railway-Car Stopper and Starter; and do hereby declare the same to be fully described in the following specification and represented in the accompanying drawing, which denotes a longitudinal section of a car with my invention applied thereto, it being what is termed a horse-car, or one to be drawn by one or more horses or draft-animals.

It being customary to operate horse-railway cars on steep grades, and to often stop them while on such a grade, it becomes very desirable to relieve the draft-animals at such time from the necessity of holding the car from descending the grade, and it also becomes desirable to have some means of aiding them in again starting the car forward, all of which can be accomplished by my invention, in the carrying out of which I combine with either or each of the wheel-axles of the car a ratchet-wheel, a pawl-case, a pawl, and a lever to operate or turn the said pawl-case on the axle, all being substantially as represented.

In the drawing, A denotes the body of the car; B B', its two axles, and C C' the wheels thereof. There is fixed on either or each of the axles, concentrically, a ratchet-wheel, D, it being arranged within an arm or pawl-case, E, applied to the axle, so as to readily turn vertically thereon, the said pawl-case being furnished, in its interior, with a pawl, F, to operate with the ratchet-wheel, or the teeth thereof. A bent lever, G, pivoted to the car-platform, and loosely jointed to the pawl-case, and arranged as represented, serves to enable the car-driver to readily turn the pawl-case on the axle, as occasion may require. The said pawl-case I usually provide with an opening, *a*, through its upper part, through which a rope or chain attached to the pawl may be passed, in order to admit of the pawl being drawn up and kept out of engagement with the ratchet-wheel while the car may be running on a level, or at such times as it may not be desirable to use the mechanism for either stopping or starting the car on the track.

When the car may be stopped on a steep grade, the driver, by means of the lever, throws up the pawl-case, so that it may bear against the car-body. The pawl and case and ratchet-wheel will then, by their co-operation, prevent the car from moving backward down the grade, and thus will relieve the draft-animals of all necessity of holding the car from so moving.

When it may be desirable to start the car forward, the driver, by taking hold of the lever and moving it, can, by it, the pawl-case, the pawl, and the ratchet-wheel, impel the car, or aid the draft-animals in starting it.

It is well known that valuable horses are frequently injured by the great exertions required of them in starting a car forward on a steep grade, and also in holding the car from descending the grade after stoppage, and while it may be waiting to take or discharge a passenger. My invention greatly, if not entirely, lessens the liability of such evil consequences.

I do not claim a car-starter consisting of a ratchet, pawl-lever, foot-rod, and lifting-spring, arranged, and combined, and applied to a car as shown in the United States Patent No. 47,722.

With my improvement I dispense with the lifting-spring, and I inclose the ratchet and pawl in a case, whereby they are covered and protected from dirt or mud, and such case is used not only as a lever to operate the pawl, but, when against the car-platform, it serves, with the ratchet and pawl, to arrest backward movement of the car. The bent lever enables the conductor with his hand to move the pawl-case.

I therefore claim—

The combination of ratchet D, pawl F, pawl-case E, and bent lever G, all substantially as and for the purpose set forth.

GEORGE × A. HUSE.
(his mark.)

Witnesses:
R. H. EDDY,
J. R. SNOW.